United States Patent [19]

Pathak et al.

[11] Patent Number: 4,687,059
[45] Date of Patent: Aug. 18, 1987

[54] ENHANCED HYDROCARBON RECOVERY PROCESS UTILIZING THERMOELASTIC FRACTURING

[75] Inventors: Prabodh Pathak, Plano; Stephen J. Salter, Dallas; Jay A. Gonzalez, Garland; Thomas K. Perkins, Dallas, all of Tex.

[73] Assignee: Atlantic Richfield Company, Los Angeles, Calif.

[21] Appl. No.: 842,517

[22] Filed: Mar. 21, 1986

[51] Int. Cl.⁴ .................. E21B 36/00; E21B 43/17
[52] U.S. Cl. .................. 166/271; 166/273; 166/302
[58] Field of Search ............... 166/271, 273, 303, 308, 166/302

[56] References Cited

U.S. PATENT DOCUMENTS 4,476,932  10/1984  Emery ........................... 166/303
4,589,491   5/1986  Perkins .......................... 166/302

OTHER PUBLICATIONS

Perkins, T. K. et al., "Changes in Earth Stresses Around a Wellbore Caused by Radially Symmetrical Pressure and Temperature Gradients", SPE Journal, Apr. 1984.
Perkins, T. K. et al., "The Effect of Thermoelastic Stresses on Injection Well Fracturing", SPE Journal, Feb. 1985.

Primary Examiner—Stephen J. Novosad
Assistant Examiner—Bruce M. Kisliuk
Attorney, Agent, or Firm—Michael E. Martin

[57] ABSTRACT

An enhanced oil recovery process comprises injection of water into a subterranean formation followed by the injection of a surfactant such as a micellar fluid and a thickening agent such as a polymer solution to drive oil toward a production well. Temperatures and pressures of injection of the water, surfactant, and thickening agent are controlled so as to thermoelastically fracture the formation behind the oil-water bank to increase the injectivity rate and propagation rate of the slugs of fluids behind the oil-water bank to control the shape of the flood front and to minimize misdirected fracturing ahead of the flood front.

8 Claims, 3 Drawing Figures

ENHANCED HYDROCARBON RECOVERY PROCESS UTILIZING THERMOELASTIC FRACTURING

BACKGROUND OF THE INVENTION

1. Field of the Invention

The present invention pertains to a process for enhancing the recovery of hydrocarbon fluids using micellar-polymer floods and by thermoelastic fracturing the fluid injection region of the formation to be produced during the flood process.

2. Background

In certain enhanced oil recovery processes, it is known to inject slugs of surfactants comprising micellar type fluids behind a waterflood or water flush slug and to follow the slug of surfactant with a polymer fluid slug to sweep the less viscous and more mobile micellar fluid slug and oil-water bank toward a production well. In the early phases of a recovery process using the micellar fluid-polymer flooding technique, the injectivity rate is relatively high because the fluid viscosity of the waterflood and the pre-injection fluid are relatively low. However, micellar fluid slug viscosities can be on the order of ten to twenty times higher than the viscosity of the pre-injection fluid which typically is treated water. During the micellar fluid slug injection, the injectivity rate may decrease dramatically as the viscous micellar fluid slug is introduced into the formation being swept. Moreover, the further injection of polymer fluid slugs, having higher viscosities than the micellar fluid slugs, even further substantially decreases the injectivity rate as the injection process is carried out.

Since the effect of the injection rate of fluids during a micellar-polymer flood recovery process is generally proportional to the rate of finanacial return on invested capital, it is particularly important that the injectivity rate be relatively high. For example, depending on the price of the mineral values recoverable, and considering the characteristics of a formation to be recovered by enhanced recovery techniques, a chemical injection rate of approximately 400 barrels per day might produce a 30% return on invested capital while an injection rate of 800 barrels per day might produce approximately a 60% return on invested capital, hence a directly proportional relationship. Accordingly, a suitable technique which would increase the chemical injection rate without significantly increasing the cost of performing the recovery process or reducing the oil recovery performance of the process could easily be justified and considered highly desirable.

A significant factor in improving the injectivity of chemicals in an enhanced hydrocarbon recovery process pertains to the formation permeability. One known technique for enhancing the recovery of hydrocarbons comprises hydraulic fracturing of the formation to be produced to create fissures or cracks which are propped open by a suitable proppant material, such as sand, to allow the flow of hydrocarbon fluids to the wellbore. Publications by T. K. Perkins and J. A. Gonzalez entitled "Changes in Earth Stresses Around a Wellbore Caused by Radially Symmetrical Pressure and Temperature Gradients" and "The Effect of Thermoelastic Stresses on Injection Well Fracturing", published in *The Society of Petroleum Engineers Journal*, April 1984, and February, 1985, respectively, describe techniques for calculating the reduction in formation stresses and the pressures required to achieve hydraulic fracturing by the injection of relatively cold liquids into a subterranean formation which initially is at a temperature significantly greater than the temperature of the injection fluid. For example, many subterranean hydrocarbon bearing formatios may be in the range of 150° F. to 200° F. nominal temperature. This temperature can be reduced by injecting water, for example, at temperatures ranging from 35° F. to 80° F., thereby significantly reducing the horizontally directed and vertically directed stresses in the formation into which the water is being injected. This reduction in formation stresses can result in reduced pressures required to hydraulically fracture the formation which improves the effective permeability of the formation and accelerates the production of recoverble fluids.

Moreover, the length of the fracture, and hence the sweep of the fluid fronts, can be influenced by the rate of injection and the properties of the fluids being injected. The thermoelastic fracture tends to be self-correcting. If the fracture tends to propagate faster than the flood front, then the fracture is arrested because it encounters higher temperature and higher fracture pressure portions of the reservoir. Furthermore, fracture lengths could be minimized, if desired, by starting fluid injection at low rates, and gradually increasing the rate as the region of increased pressure expands around the injection well.

U.S. Pat. No. 4,476,932 to L. W. Emery and assigned to the assignee of the present invention also suggests that the fracturing of a formation can be enhanced by injecting cold fluid into a desired region to be fractured while isolating that region or fracturing by the further injection of a warm liquid adjacent to the zone to be fractured. Although cold fluid injectin has been suggested as a way to reduce fracture pressures, the prior art has failed to recognize or suggest such a technique for increasing formation permeability in chemical flooding processes. Accordingly, it it an object of the present invention to provide an improved enhanced oil recover process utilizing thermoelastic fracturing of a subterranean formation during a fluid sweep of the formation utilizing micellar fluids and/or polymer fluids to recover hydrocarbon fluids trapped in the formation region which is desired to be produced.

SUMMARY OF THE INVENTION

The present invention provides an improved recovery process for producing hydrocarbon fluids from a subterranean formation by the injection of fluid slugs with predetermined flow properties in a predetermined sequence and at a fluid temperature significantly lower than the temperature of the formation being injected whereby thermoelastic fracturing of the formation occurs to enhance the injectivity rate of fluids and the sweep of the fluid slugs through the formation to force the recovery of the fluids desired to be produced.

In accordance with one aspect of the present invention, a subterranean earth formation is pre-cooled by the injection of water to flood the formation, followed by the injection of a micellar fluid slug to recover the residual fluids left in place after the waterflood sweep and followed by the injection of a polymer fluid slug to sweep the micellar fluid surfactant and residual oil through the formation to a producing well. The polymer fluid slug may be urged through the formation by further injection of water or other suitable driving fluid.

In accordance with another aspect of the present invention, the temperatures of the various fluids injected into the formation are controlled ot reduce formation stresses and produce hydraulic fractures which may be propagated at a desired rate or in a desired order in accordance with the particular fluid being injected. One advantage of the present invention is that unwanted fracture propagation is avoided since injection pressures are maintained at levels which preclude fracturing in the highly stressed higher temperature regions. Accordingly, a fracture cannot progress beyond the flood front of the fluid at the controlled lower temperature. Depending on the injected fluid and the reservoir fluid flow characteristics, the rock properties of the formation being injected and the in situ earth stresses, the extent of the thermoelastic fracture can be controlled in such a way as to permit the propagation of fluid fronts that yield relatively high sweep efficiencies.

The advantages of the present invention over conventional hydraulic fracturing include avoidance of the problem wherein the shape and extent of a prefractured formation determine the sweep efficiency of a micellar-polymer flood process. For example, in certain instances hydraulic fractures can grow in such a way that almost direct communication between an injection well and a producing well is established. Such a fracture development reduces the chemical flood sweep efficiency and thus the total amount of oil recovered. In contrast with conventional hydraulic fracturing, the improved fracturing and injection process of the present invention provides for creation of the thermoelastic hydraulic fracture during or after all of the fluids have been injected. In this way the flood front of the respective fluid slugs maintain a desired shape and sweep efficiencies remain relatively high.

Another advantage of the improved process of the present invention is due to the fact that fracture growth may be controlled easily by changes in injection rate, injection fluid temperature or injection fluid rheological properties. In this way, some corrective action can normally be taken in the event that production under the micellar-polymer fluid injection process decreases or is insufficient. Still further, with the fracturing and injection process of the present invention, the range of types of formations that can be flooded by the micellar fluid-polymer fluid process can be extended.

For example, generally sandstone-type reservoirs with permeabilities larger than 10 millidarcys (md) and hydrocarbon liquid viscosities less than 30 centipoise (cp) are typically good candidates for micellar fluid flooding. With the use of thermoelastic fracturing in accordance with the present invention, injectivity rates are sufficiently great as to extend micellar fluid polymer fluid flooding to formations with permeabilities less than 10 md and oil viscosities greater than 30 cp.

Although certain important aspects and advantages of the present invention are mentioned hereinabove, additional superior features of the invention will be apparent to those skilled in the art upon reading the detailed description which follows in conjunction with the drawing.

DESCRIPTION OF PREFERRED EMBODIMENTS

Figure 1:
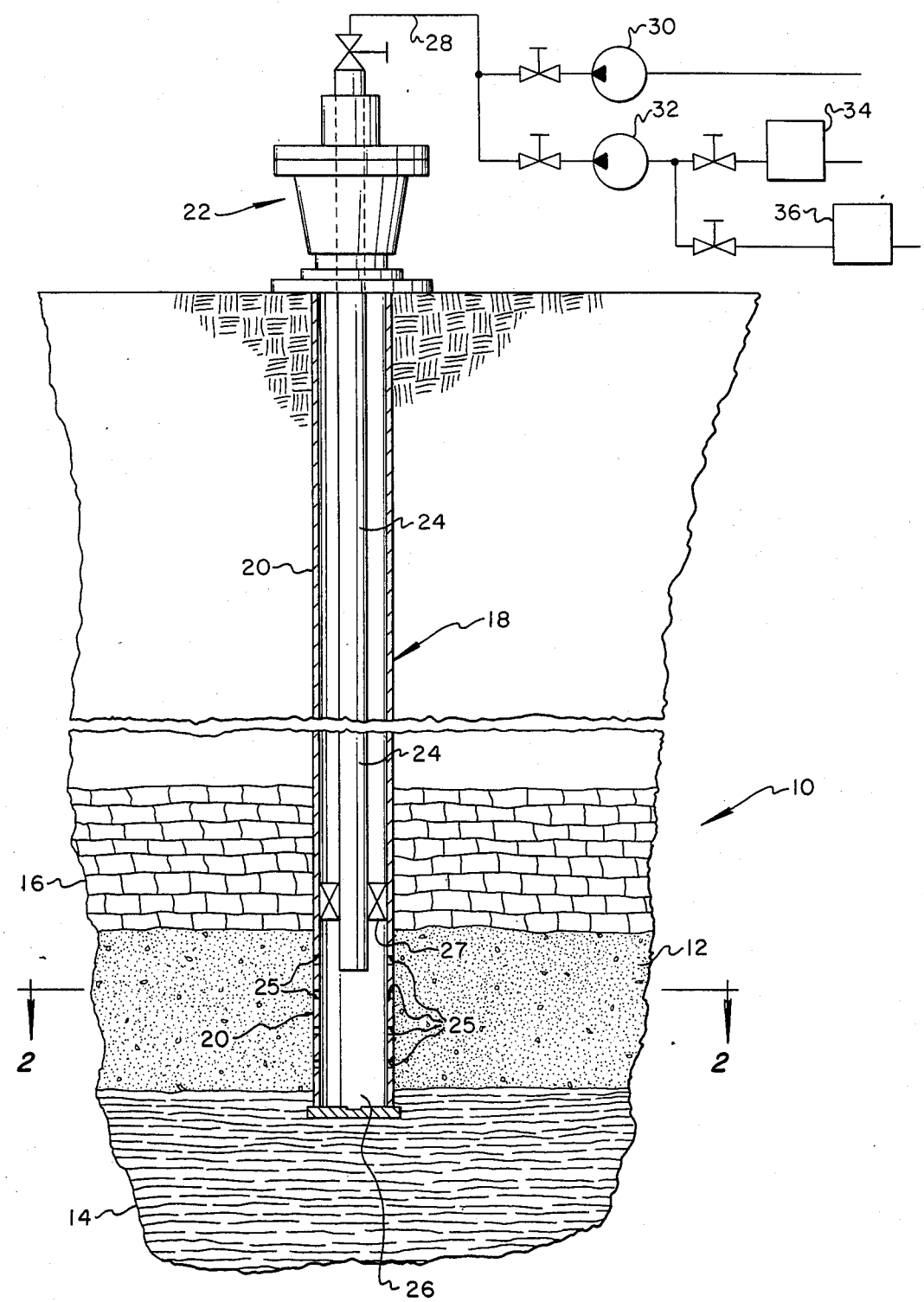
FIG. 1 is a vertical section view in somewhat schematic form of a subterranean earth formation which has been drilled and completed for injection of fluids to stimulate the recovery of hydrocarbon fluids.

In the descripiton which follows in conjunction with the drawing figures, somewhat idealized subterranean formations and well placement schemes are described. Although the present invention may be carried out as described in a substantially homogeneous formation, certain formation discontinuities or interruptions may result in less than a completely symmetrical pattern of injection, fracture propagation, and fluid flow.

Referring to FIG. 1, there is illustrated an earth formation, generally designated by the numeral 10, in which a formation region 12 has been identified for the production of fluids such as liquid hydrocarbons. The formation region 12 is illustrated disposed between an underburden formation 14 and overburden 16 which may or may not be capable of yielding recoverable quantities of minerals. A well 18 has been drilled into the formation region 12 and provided with suitable casing 20, a wellhead 22, tubing or conduit 24 extending into the lower portion of a wellbore 26 and sealed by a packer 27 to provide for the injection of fluids into the formation region 12 in accordance with the invention to be described herein. The casing 20 is perforated at a plurality of perforation openings 25 whereby fluids may be injected from the wellbore 26 into the formation region 12.

The wellhead 22 is of conventional construction and is suitably arranged to communicate the tubing 24 with a fluid supply conduit 28 which is adapted to be connected to pumps 30 and 32 for injecting various types of fluids into the formation region 12. For example, the pump 30 is adapted to be connected to a source of treated water, not shown, and the pump 32 is connected to a source of micellar fluid additive 34 and alternatively, to a source of polymer fluid additive 36 whereby these fluids may be selectively injected. Typically, a micellar fluid is created by the addition of selected quantities of alkylaryl sulfonates to water and a polymer fluid drive is accomplished by mixing preselected quantities of polyacrlyamide or polysacharide to water for injection after the injection of the micellar fluid.

In known enhanced oil recovery processes the injection of micellar fluids may be followed by the injection of polymer fluids as a drive fluid to sweep the micellar fluid-oil combination toward the producing well. The injectivity rate of these fluids is dependent on formation permeability which can be improved by hydraulic fracturing of the formation prior to injection of the micellar fluid or the drive fluid. However, conventional hydraulic fracturing may result in fracture propagations which are not conducive to an efficient sweep of the formation by the micellar or polymer fluids. In some instances the fracture may even form a direct fluid flow path between an injection well and one or more producing wells.

In contrast with the prior art processes and in accordance with this invention, it is contemplated to inject surfactants and drive fluids which are substantially lower in temperature than the temperature of the formation being flooded. For example, ambient reservoir temperatures in the range of 150° F. to 200° F. may be encountered in many hydrocarbon bearing earth formations. The injection of treated water or other liquids at nominal surface water ambient temperatures of from 40° F. to 80° F., for example, can significantly reduce the stress in the formation being injected by as much as 30 percent to 40 percent as indicated in the reference publications mentioned herein. This reduction in stresses can be utilized advantageously in accordance with the enhanced recovery process of the present invention.

Figure 2:
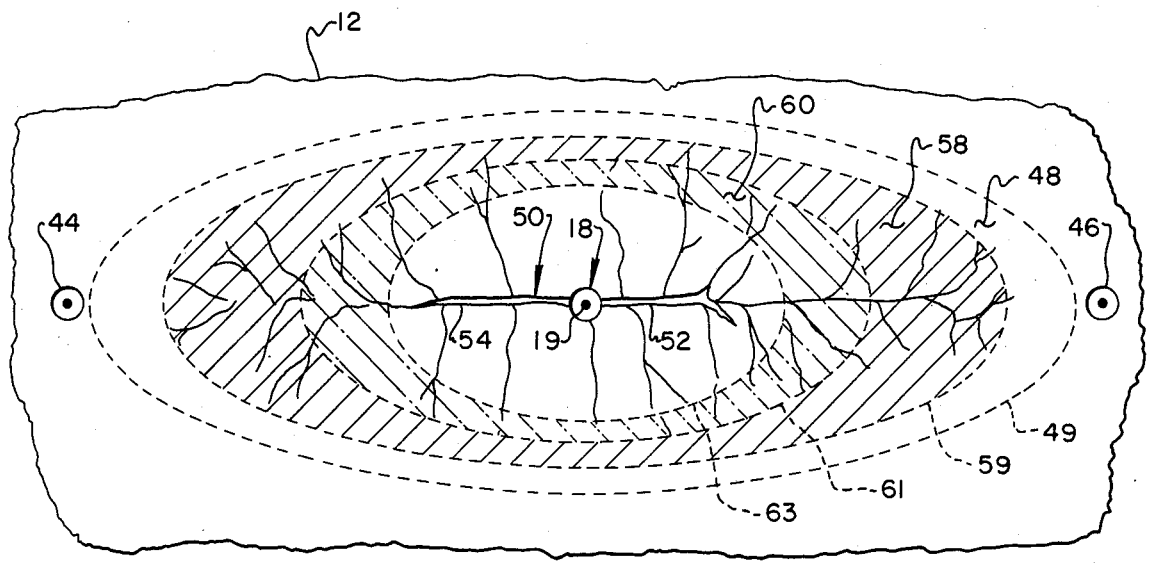
FIG. 2 is a plan view taken generally along the line 2—2 of FIG. 1 showing two producing wells and illustrating a sequence of flooding the formation to be produced in accordance with the present invention.

Referring to FIG. 2, as illustrated by way of example, the well 18 can be disposed between two production wells 44 and 46 which have also been drilled into the formation region 12. The somewhat idealized pattern of fracturing and migration of flood fronts of water, micellar fluid, polymer fluid and a further injection of water is illustrated for an arrangement wherein fracturing progresses toward the production wells 44 and 46 somewhat equally and the extent of the fracture provides for permeation of the fluids through a somewhat elliptical shaped zone, designated by the numeral 48, having frontal boundary 49 and a centroid at the central axis 19 of the well 18. The fracture might progress initially as a two-winged vertical fracture 50 having opposed wing portions 52 and 54, respectively. The main fracture wings 52 and 54 may not necessarily migrate directly toward the production wells 44 and 46 and a different pattern of production wells around the injection well 18 can be developed. The exemplary flooding arrangement illustrated in FIG. 2 shows a flood which has developed wherein, initially, relatively cold water is injected to relieve the stresses in the formation region 12 within the confines of the zone 48 resulting in the progression of a fracture as illustrated. The ellipticity of the zone 48 may result in a much more cylindrical configuration depending on the progression of the fracture wings 52 and 54, the associated secondary fractures extending perpendicular to the plane of the fracture wings 52 and 54 together with other relatively minor fractures extending in other directions.

In all events, the present invention contemplates that with the injection of relatively cold water into a heated formation, that the reduction in stresses in the flooded area or within the zone 48, for example, will reduce the pressure required to create fractures within the zone 48 and injection pressures may be of the order to propagate such fractures. After the injection of water to create a water/oil front defined by the boundary line 49 of zone 48, a micellar fluid slug is injected which migrates outwardly in the zone 48 to form a zone 58 having an outer boundary 59, FIG. 2, extending toward the wells 44 and 46. The temperature of the micellar fluid slug is also maintained in the same range as the temperature of the water which was injected to initially form the boundary of the flood front defining the elliptical zone 48. This injection of relatively cold micellar fluid may be followed by the injection of a slug of polymer fluid which also progresses outwardly from the well 18 to form the zone 60 having a frontal boundary 61 for driving the slug of micellar fluid and oil toward the respective producing wells 44 and 46. The rates of injection of the micellar fluid slug and the polymer fluid slug are adjusted to give a slowly propagating two-winged fracture that does not overtake the micellar fluid frontal boundary 59. Further injection of relatively cold water may follow the slug of polymer fluid to form a frontal boundary 63 for driving the slugs or zones of polymer fluid and micellar fluid and oil, as indicated, toward the production wells.

In FIG. 2 the boundary lines 59, 61 and 63 define the frontal boundaries of the slugs of micellar fluid, polymer fluid and secondary water injection, respectively. It is believed that the injectivity of subterranean hydrocarbon production zones which have permeabilities in the range of 50 md to 200 md may be significantly enhanced using the process of the present invention. Typically, formations having permeabilities greater than 500 md would not benefit from the method of the invention as much as lower permeability formations which are at relatively high temperatures and wherein the injection of fluids in the range of temperatures of about 32° F. to 70° F. can significantly lower the in situ stresses as indicated in the references cited herein.

For example, total tangential earth stress in a particular formation may be reduced as much as 30 percent to 40 percent by the injection of fluids in the temperature ranges indicated above wherein previously the temperatures of the formations were in the range of 150° F. to 200° F. One of the outstanding advantages of the present invention resides in a method wherein injection of several fluids may be carried out at respectively different temperatures to thereby alter the characteristics of the migration of the respective fluid fronts or slugs through the formation from the injection well or walls to the respective pattern of production wells.

Figure 3:
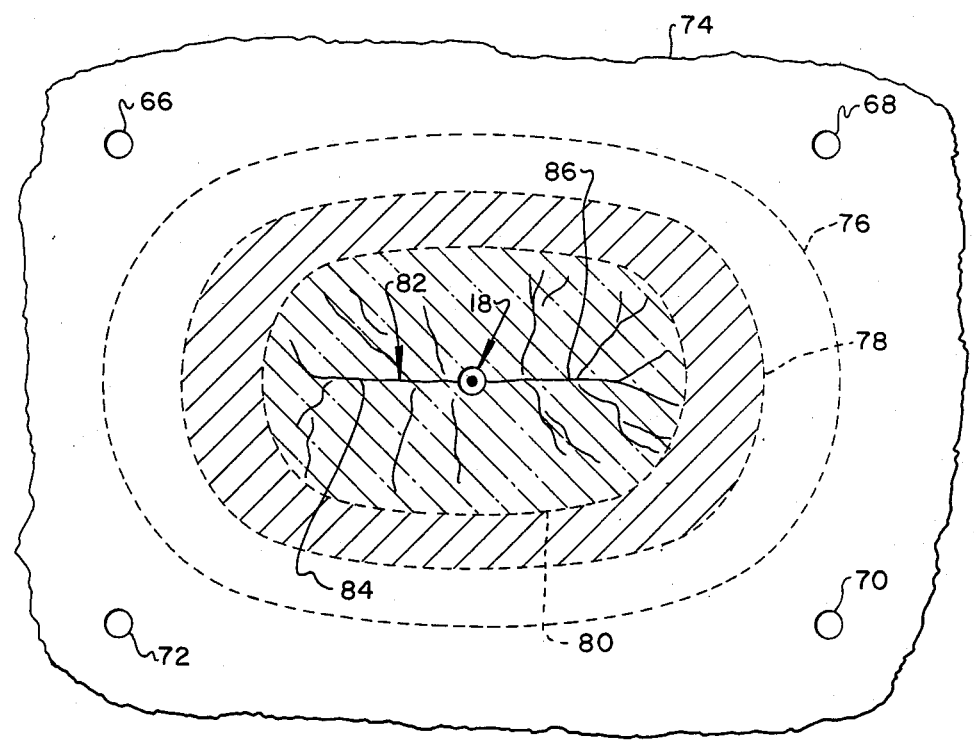
FIG. 3 is a plan view of a pattern of four producing wells spaced from the injection well and in accordance with a flooding process of the present invention.

Referring to FIG. 3, for example, an injection well 18 is located in the center of a generally rectangular pattern which also includes four production wells 66, 68, 70 and 72. A formation region 74, similar to the formation 12, may be injected with water initially to drive oil through the formation material toward the production wells. This water injection is defined by a flood frontal boundary 76. The water injection may be carried out at a temperature not significantly less than the temperature of the formation to thereby avoid premature fracturing of the formation and giving too much directional character to the flood frontal boundary. The oil-water flood front may be followed by the injection of a slug of surfactant such as a micellar fluid to provide a flood frontal boundary 78. The temperature of the micellar fluid slug may also be elevated to preclude giving unwanted direction to the shape of the flood zone by prematurely fracturing the formation 74.

Once it is determined, however, that the polymer fluid slug is to be injected, the temperature of the micellar lfuid slug may be lowered to the point where reduced stresses in the formation are formed during injection of the micellar fluid slug to provide for the initiation of fractures to thereby increase the permeability of the formation. This may be desireable to improve the injection rate of the polymer fluid slug which is then injected to provide a shaped flood front indicated by the frontal boundary 80. The temperature of the polymer fluid slug may also be lowered significantly from the temperature of the formation 74 and the injection rate may be carried out at a pressure which will initiate a two-winged fracture 82 having opposed fracture wings 84 and 86.

Accordingly, not only is the injectivity of the more viscous polymer fluid slug increased, but control of the pressure of the polymer fluid slug will assure substantial fracturing of the formation 74 at a pressure lower than would be required for conventional hydraulic fracturing. Moreover, by fracturing the formation 74 after the initial slug of water or other lfuid is injected and followed by the injection of a surfactant to sweep residual oil not driven toward the production wells by the water slug, the shape of the water and other fluid slug fronts may be maintained in a desired configuration and the efficiency of the flood sweep kept fairly substantial. This avoids the problem of developing fractures which progess directly toward a producing well. Fracturing is also generated at a slow enough rate so as to be controlled by changes in injection rate, injection fluid temperature or injection fluid rheology.

Those skilled in the art will recognize that as fluids of different viscosities are injected into formations of relatively low permeability that control of the injection temperatures and pressure may be advantageously carried out to increase injection rates at relatively low energy expenditures while controlling the shape of the flood front and improving the injectivity of more viscous fluids. It wil be appreciated that the temperatures of th slugs of water, surfactant solution, and more viscous drive solutions such as polymer fluids may be selectively controlled to create fractures and increase injectivity rate as required in order to maintain suitable injection rates, shape of fluid flood fronts and the overall efficiency of the recovery process.

Although an improved method of enhanced hydrocarbon recovery has been described above, those skilled in the art will recognize that various modifications and substitutions may be made to the present invention without departing from the scope and spirit of the appended claims.

What we claim is:

1. A method for producing hydrocarbon fluids from a subterranean formation into which at least one injection well and one production well have been drilled, respectively, said method comprising the steps of:

injecting water into said formation through said injection well to form a flood front progressing through said formation, said injection of water being at a temperature and pressure such as to preclude significant fracturing of said formation;

injecting a fluid into said formation after the injection of said water at a temperature substantially lower than the ambient temperature of said formation so as to reduce the in situ stresses in said formation, said fluid being injected at a pressure which will propagate fractures through a region of said formation flooded by said water so as to increase the permeability thereof and the injectivity rate of said fluid for driving the flood front of said water and oil toward said at least one production well.

2. The method set forth in claim 1 wherein:
the step of injecting said fluid includes providing said fluid having a viscosity at its injection temperature which is greater than the viscosity of water so as to maximize the volume of the region of said formation which is swept.

3. The method set forth in claim 1 wherein:
the permeability of said formation is less than about 500 millidarcy.

4. The method set forth in claim 1 wherein:
the step of injecting said fluid includes injecting fluid in the temperature range of about 32° F. to 80° F.

5. A method for producing hydrocarbon fluids from a subterranean formation into which at least one injection well and at least one production well have been drilled, respectively, comprising the steps of:

injecting a quantity of relatively low viscosity liquid into said formation to form a flood front progressing through said formation towards said at least one production well;

lowering the temperature of the injected liquid during latter stages of injection to reduce the in situ stresses in said formation;

controlling the pressrue of injection to commence fracturing said formation behind said flood front;

injecting a surfactant into said formation to drive said liquid through said formation toward said at least one production well, said surfactant having a viscosity greater than the viscosity of said liquid; and controlling the temperature of said surfactant during injection thereof so as to reduce stresses in said formation, the pressure of injection of said surfactant being such as to propagate said fractures in said formation with the flood front of said surfactant so as to increase the injectivity rate of said surfactant into said formation and reduce the pressure required for a given injectivity rate.

6. The method set forth in claim 5 including the step of:

injecting a viscous fluid behind said surfactant having a viscosity greater than said surfactant so as to sweep a slug of said surfactant and oil toward said at least one production well, the temperature of said viscous fluid being such as to reduce in situ stresses in said formation, and the pressure of the said viscous fluid being such as to increase the fracturing of said formation whereby the injection rate of said viscous fluid is increased beyond that possible without fracturing said formation at said temperature and pressure of said viscous fluid.

7. A method of providing enhanced recovery of oil from a subterranean formation having an elevated temperature of at least 150° F. or greater wherein at least one injection well and at least one production well have been drilled into said formation, respectively, said method comprising the steps of:

injecting water into said formation through said injection well at a pressure and temperature such as to propagate a flood front of water outwardly from said injection well through said formation and toward said at least one production well without fracturing said formation;

injecting a micellar fluid into said formation through said injecting well following injection of said water at a temperature lower than the temperature of said water injection to reduce in situ stresses in said formation, said micellar fluid being injected at a pressure sufficient to initiate fracturing of said formation to increase the injectivity of said micellar fluid and the propagation of a water/oil bank toward said at least one production well; and injecting a polymer solution into said formation through said injection well, said polymer solution having a viscosity greater than the viscosity of said micellar fluid to drive a bank of said micellar fluid through said formation toward said at least one production well, the temperature and pressure of injection of said polymer solution being such as to increase the permeability of said formation by further fracturing said formation.

8. A method of providing enhanced recovery of oil from a subterranean formation having an elevated temperature of at least 150° F. or greater wherein at least one injection well and at least one production well have been drilled into said formation, respectively, said method including the steps of:

injecting a surfactant such as micellar fluid into said formation through said injection well at a temperature such as to reduce in situ stresses in said formation, said surfactant being injected at a pressure sufficient to initiate fracturing of said formation to increase the injectivity of said surfactant and the propagation of a surfactant flood front toward said at least one production well; and injecting a drive fluid such as polymer solution into said formation through said injection well to drive a bank of said surfactant and oil toward said at least one production well, the temperature and pressure of injection of said drive fluid being such as to increase the permeability of said formation by further fracturing said formation without extending the formation fractures substantially ahead of said surfactant flood front.

* * * * *